United States Patent [19]
Cheng et al.

[11] Patent Number: 5,963,933
[45] Date of Patent: Oct. 5, 1999

[54] EFFICIENT IMPLEMENTATION OF FULL OUTER JOIN AND ANTI-JOIN

[75] Inventors: Josephine M. Cheng; Ting Yu Leung; Mir Hamid Pirahesh, all of San Jose, Calif.

[73] Assignee: International Business Machines Corporation, Armonk, N.Y.

[21] Appl. No.: 08/882,027

[22] Filed: Jun. 25, 1997

[51] Int. Cl.⁶ .................................................. G06F 17/30

[52] U.S. Cl. .................... 707/2; 707/3; 707/4; 707/5; 707/100; 707/102; 707/103

[58] Field of Search .................... 707/2–5, 100, 707/102, 103; 434/336, 350; 340/146.2; 395/500; 457/21

[56] References Cited

U.S. PATENT DOCUMENTS

| | | | |
|---|---|---|---|
| 5,412,804 | 5/1995 | Krishna | 707/2 |
| 5,557,791 | 9/1996 | Cheng et al. | 395/600 |
| 5,701,454 | 12/1997 | Bhargava | 707/2 |
| 5,765,159 | 6/1998 | Srinivasan | 707/102 |
| 5,797,136 | 8/1998 | Boyer | 707/2 |

OTHER PUBLICATIONS

"Hypergraph Based Reordering of Outer Join Queries With Compelx Predications", Gautam Bhargava, Piyush Goel & Bala Iyr, ACM 0–89791–731–6/95/0005, 1995, pp. 304–315.

"SQL Query Optimization: Reordering for a General Class of Queries", Piyush Goel & Bala Iyer, ACM 0–89791–794–4/96/0006, 1996, pp. 47–56.

Primary Examiner—Thomas G. Black
Assistant Examiner—Diane D. Mizrahi
Attorney, Agent, or Firm—Gray Cary Ware Freidenrich

[57] ABSTRACT

Method for specifying SQL "full outer joins" which enables the use of arbitrary join conditions in specifying the query. This is enabled by equating a full outer join with a left outer join unioned with a right outer join less the matched tuples from the right outer join. A number of embodiments further present improvements in execution speed. One such improvement utilizes as a second operand of the union query a novel operator, the "ANTI-JOIN". The anti-join is implemented as a right outer join coupled with an ISNULL predicate.

52 Claims, 7 Drawing Sheets

EFFICIENT IMPLEMENTATION OF FULL OUTER JOIN AND ANTI-JOIN

BACKGROUND OF THE INVENTION

1. Field of the Invention

This invention relates to query mechanisms for relational database management systems. More particularly, the present invention relates to a novel method of evaluating SQL "full outer joins", which methodology enables the use of arbitrary join conditions in specifying the query.

2. Description of the Related Art

A relational database management system, or RDBMS, is a computer implemented database management system that uses relational techniques for storing and retrieving data. Relational databases are computerized information storage and retrieval systems in which data in the form of tables, formally denominated as "relations", are typically stored for use on disk drives or similar mass data stores. A "table" includes a set of rows, formally denominated "tuples" or "records", spanning several columns. Each column in a table includes "restrictions" on the data contents thereof and may be designated as a primary or foreign key. Reference is made to C. J. Date, *An Introduction to Database Systems*, 6th edition, Addison-Wesley Publishing Co. Reading, Mass. (1994) for a comprehensive general treatment of the relational database art.

The tables are typically stored on direct access storage devices (DASD) such as magnetic or optical disk drives. Data may be retrieved from this type of database by a variety of methods. For example, a computer program can extract information from the database without human intervention. This is the case in batch or embedded processing. In the latter example, queries are embedded in the compiled program, and when executed, return an answer set to the compiler, which then integrates the answer set into the remainder of the compilation. Alternatively, a user can interact with a query system program which serves as a front-end to the database system. "Accessing a table" is a term used in the art to mean reading information from a table. Since the tables are normally stored on DASD, accessing a table requires transferring all of part of the table from DASD into the random access memory, or RAM, of the computer system. When information is needed from a plurality of tables, the tables may be joined by the database software of firmware.

A RDBMS is structured to accept commands to store, retrieve and delete data using high-level query languages such as the Structured Query Language, or SQL. The term "query" denominates a set of commands for retrieving data from a stored database. The SQL standard has been promulgated by the International Standards Association since 1986. Reference is made to the SQL-92 standard "Database Language SQL" published by the ANSI as ANSI X3.135-1992 and published by the ISO as ISO/IEC 9075: 1992 for the official specification of the 1992 version of the Structured Query Language. Reference is also made to James R. Groff et al. (*LAN Times Guide to SQL*, Osborne McGraw-Hill, Berkeley, Calif., 1994) for a lucid treatment of SQL-92, and to Don Chamberlin, Using the New DB2, Morgan Kaufman Publishers, Inc, 1996, for further discussion of that language.

As used herein, an RDBMS "query" refers to a set of user commands for retrieving data from the stored database. The query language requires the return of a particular data set, sometimes referred to as "the answer set", in response to a particular query, but the method of query execution, or "Query Execution Plan", employed by the RDBMS is not specified by the query. There are typically many different useful execution plans for any particular query, each of which returns the required data set. For large databases, the execution plan selected by the RDBMS to execute a query must provide the required data return at a reasonable cost in time and hardware resources.

Conceptually, the SQL SELECT operation forms a Cartesian product of the tables specified in the FROM clause and then selects the tuples that satisfy the predicates specified in the WHERE clause. As a result of this selection some tuples of the input tables may not appear in the output; i.e., the operation loses some of the input tuples. A variant of the SQL SELECT operation, called the OUTER JOIN, has been defined, which does not lose any of the input tuples. For a discussion of this variant, reference is made to IPSO-ANSI92, the Working Draft: Database Language SQL2 and SQL3; X3H2; ISO/IEC JTC1/SC21/WG3.

Joins allow additional information to be obtained across tables in a meaningful way. A simple example would be that a table of employee information lists an employee's department number as '76', but the definition of department '76' requires reference to another table, the Department-table, which lists the full department title associated with each department number. In this second table the row for department '76' also contains a column with the department title 'Information Systems Department'. Thus, a user desiring to generate a report containing a list of all employees including their department titles may want to establish a join relationship between the department number column in the Employee-table and department title column in the Department-table, so that the employees' department can be printed in the title form instead of the numerical form. Ways of specifying and performing joins are the subject of substantial effort. This is because database tables can be very large and processing tables can be expensive in terms of computer resources. Therefore, it is important that methods for joining tables be efficient.

SQL supports outer and inner joins. The semantics of the outer join are outlined as follows: An outer join involves a join of two tables, which are referred to as the left table and the right table. An outer join differs from an inner join in that it includes rows that have no "partners"—that is, rows from the left table that have no matching rows in the right table, or vice versa. Several subcategories of the outer join operation have been defined: specifically they are the FULL OUTER JOIN, LEFT OUTER JOIN and RIGHT OUTER JOIN. These operations have two operands, the previously discussed left and right tables. If tuples of both tables are preserved, then the operation is called full outer join. If the tuples of only one table are preserved, e.g., the left table or the right table, then the result is respectively a left or right outer join. In the output or answer set, for the non-matching tuples of a preserved table, NULL values are assigned to the columns of the other table.

The Left Outer Join

A left outer join includes rows from the left table that have no matching values in the right table. These rows are given null values for the missing data. Consider the following query to tables T1 and T2:

```
SELECT q1.c1, q1.c2, q2.c1, q2.c2
FROM T1 q1 LEFT OUTER JOIN T2 q2
ON (q1.c1>=q2.c2)
```

This query returns all the matching pairs of T1 and T2 tuples based on the join condition "q1.c1>=q2.c2", just as in a regular join. The query also returns rows of T1 which do not match any T2 rows based on the join condition. In this example, T1 is called the tuple-preserving operand, while T2 is called the null-producing operand, because T1 tuples will be preserved when there is no match in T2.

The Right Outer Join

The right outer join is the same as left outer join, except that the join operands, i.e., the participating tables, are commuted. Thus, the right outer join includes rows from the right table that have no matching values in the left table. These rows are again given null values for any missing data elements. Accordingly, the following two outer joins are equivalent:

```
SELECT q1.c1, q1.c2, q2.c1, q2.c2
FROM T1 q1 LEFT OUTER JOIN T2 q2
ON (q1.c1>=q2.c2)
SELECT q1.c1, q1.c2, q2.c1, q2.c2
FROM T2 q2 RIGHT OUTER JOIN T1 q1
ON (q1.c1>=q2.c2)
```

The Full Outer Join

A full outer join includes both those rows from the left table that have no matching values in the right table, as well as those rows from the right table that have no matching values in the left table. In either case, rows lacking matching values in the opposite table are given null values for the missing data. Consider the following query:

```
SELECT q1.c1, q1.c2, q2.c1, q2.c2
FROM T1 q1 FULL OUTER JOIN T2 q2
ON (q1.c1>=q2.c2)
```

This query returns all the matching pairs of T1 and T2 tuples based on the join condition "q1.c1>=q2.c2". The query also returns rows of T1 which do not match any T2 rows based on the join condition as well as rows of T2 which do not match any T1 rows.

Note that a full outer join is not equivalent to a union of a left outer join and a right outer join. It will therefore be appreciated that the full outer join defined above is not identical to the following query:

```
SELECT q1.c1, q1.c2, q2.c1, q2.c2
FROM T1 q1 LEFT OUTER JOIN T2 q2
ON (q1.c1>=q2.c2)
UNION ALL
SELECT q3.c1, q3.c2, q4.c1, q4.c2
FROM T1 q3 RIGHT OUTER JOIN T2 q4
ON (q3.c1>=q4.c2)
```

This is due to the fact that the regular join portion of the full outer join is performed twice: once by the left outer join and again by the right outer join, thereby leading to an incorrect result.

Many database management systems support left and right outer joins. Some systems further support full outer joins, but they impose the strict limitation that only the conjunction of equality predicates is allowed as the join condition. This limitation is due to the fact that these systems implement the full outer join using a modified merge join algorithm which, prior to the making of the present invention, has inherently been restricted to the use of equality predicates.

Efforts at outer join optimization have been made by others. Some of the inventors of the present invention teach outer join optimization in U.S. Pat. No. 5,557,791. Further, P. Goel and B. Iyer address this matter in "SQL Query Optimization: Reordering for a General Class of Queries.", published in the Proceedings of the ACM SIGMOD '96 International Conference on Management of Data, Montreal, Canada, pp 47–56, (1996). Finally, G. Bhargava, P. Goel and B. Iyer present another methodology in "Hypergraph based reorderings of outer join queries with complex predicates.", Proceedings of the ACM SIGMOD '95 International Conference on Management of Data, San Jose, Calif., pages 304–315, (1995).

In general, each of these references regarding outer join implementation shares common theme: the strategies taught therein require special runtime operators, which somehow keep track of which tuples must be preserved. In the prior art this has typically been done by creating and maintaining some list of tuple identifiers, or TIDs, for those tuples which must be preserved. When the outer join condition involves only equality predicates in the conjunctive normal form, it is possible to implement the full outer join via a modified merge join algorithm without keeping lists of preserved tuple identifiers. However, a modified merge join, according the prior art, cannot be used for arbitrary join conditions, including but not necessarily limited to the inequality predicate and disjunction, as specified in IPSO-ANSI92. Moreover, the creation and maintenance of TID lists introduces an unwanted and now unnecessary element of computational overhead, thereby inducing system performance problems in any system which relies on such lists.

Join conditions are well defined in IPSO-ANSI92. Typically, join conditions defining the relationship between tuples are logically selectable from the following set of predicates:

is null;
like;
equals (=);
does not equal ($\neq$)
is greater than (>);
is less than (<);
is greater than or equal to ($\geq$); and
is less than or equal to ($\leq$).

A plurality of these conjunction predicates can also be logically joined by the logical operators AND, OR, and NOT. Accordingly, as used herein, the term "arbitrary join conditions" defines any of these join conditions, or a plurality of join conditions joined by one of the defined logical operators. This precisely defined term defines over prior art full outer join methodologies, which support only the equality predicate.

Finally, the computation of large queries implementing a full outer join can be resource intensive. This problem is often exacerbated by increasingly complex query structures where the union of a plurality of outer joins repeatedly returns a number of instances of a matching pair. Any solution to the problem of using a modified merge join to implement a full outer join and which further enables the use of arbitrary join conditions should, to the greatest extent possible, minimize the impact of the query on system resources by only returning the first instance of a matching pair.

Accordingly, there is a clearly-felt need in the art for a methodology which enables the use of a modified merge join to implement a full outer join which enables the use of arbitrary join conditions other than the equality predicate. There is a further need that this query methodology return only a first instance of a matching pair in response to a join condition, thereby enabling the methodology to be resource efficient. These unresolved problems are clearly felt in the art and are solved by this invention in the novel manner described below.

SUMMARY OF THE INVENTION

This invention devises, for the first time, a mechanism which enables the implementation of the full outer join with any join condition, including but not necessarily limited to the inequality predicate and disjunction. This is enabled in one embodiment of the present invention by equating, in a novel manner, a full outer join with a left outer join unioned with a right outer join less the matched tuples from the right outer join. To implement this embodiment, a full outer join query is programmatically rewritten as a union of a left outer join and a select query with a "not-exists" subquery. Indeed, the present invention provides, for the first time, a methodology for properly unioning a left outer join and a right outer join whereby the result is a properly formed full outer join producing a correct answer set.

It is recognized that transforming a full outer join into a union query with a not-exists subquery may present suboptimal performance in some applications. This may be due to the fact that subqueries tend to be slow to execute, especially in massively parallel processing (MPP) shared-nothing environments. An improved embodiment therefore programmatically transforms the full join query into a union query of a left outer join and a right outer join but for the right outer join, all the matched rows are filtered out so that a correct answer set results. This embodiment requires the use of at least one non-nullable column.

Where an outer join operand does not have any non-nullable column, for instance as when the operand is a derived table, a further improved embodiment adds a column of constants to achieve the same effect as the previous embodiment. For example, suppose both tables DT1 and DT2 are not base tables: i.e., their row identifiers are not readily available, and all columns are nullable. By adding a column, or key, of constant value 1, or indeed of any other constant, in the operand of the right outer join, it can be assured that the column value is null for the preserved tuples of DT2. Hence, it is always possible to select those DT2 rows that do not have any matching rows in DT1.

Given that the principles of the present invention implement a full outer join as a union of a left and a right outer join, a further optimization is accomplished by the final embodiment of the present invention by recognizing that all the matched rows in the right outer join are filtered out. This embodiment is implemented by using as a second operand of the union query a novel operator, the "ANTI-JOIN". The anti-join can be implemented as a right outer join coupled with an ISNULL predicate, or equivalently, it can be implemented directly using a new run time operator. Since computing all matched rows which will be eventually filtered out is computationally inefficient, the use of the anti-join presents significant savings in efficiency of implementation.

It is emphasized that the principles of the present invention achieve the several features and advantages hereof without any restriction on the join condition for the full outer join. This is true because there is no restriction on the join condition for left and right outer joins.

An additional advantage of the present invention is that the features and advantages of the several embodiments taught herein are obtained without a requirement for any new runtime operators to implement the full outer joins.

The foregoing, together with other objects, features and advantages of this invention can be better appreciated with reference to the following specification, claims and accompanying drawing.

BRIEF DESCRIPTION OF THE DRAWING

For a more complete understanding of this invention, reference is now made to the following detailed description of the embodiments as illustrated in the accompanying drawing, wherein.

DESCRIPTION OF THE PREFERRED EMBODIMENTS

While the principles of the present invention may be implemented using a number of RDBMS query languages, the preferred embodiments disclosed herein are programmatically implemented using the Structured Query Language, SQL. Reference in made to the SQL-92 standard "Database Language SQL" published by the ANSI as ANSI X3.135-1992 and published by the ISO as ISO/IEC 9075: 1992 for the official specification of the 1992 version of SQL. Each of these authorities is herewith incorporated by reference.

The System of the Invention

Figure 1:
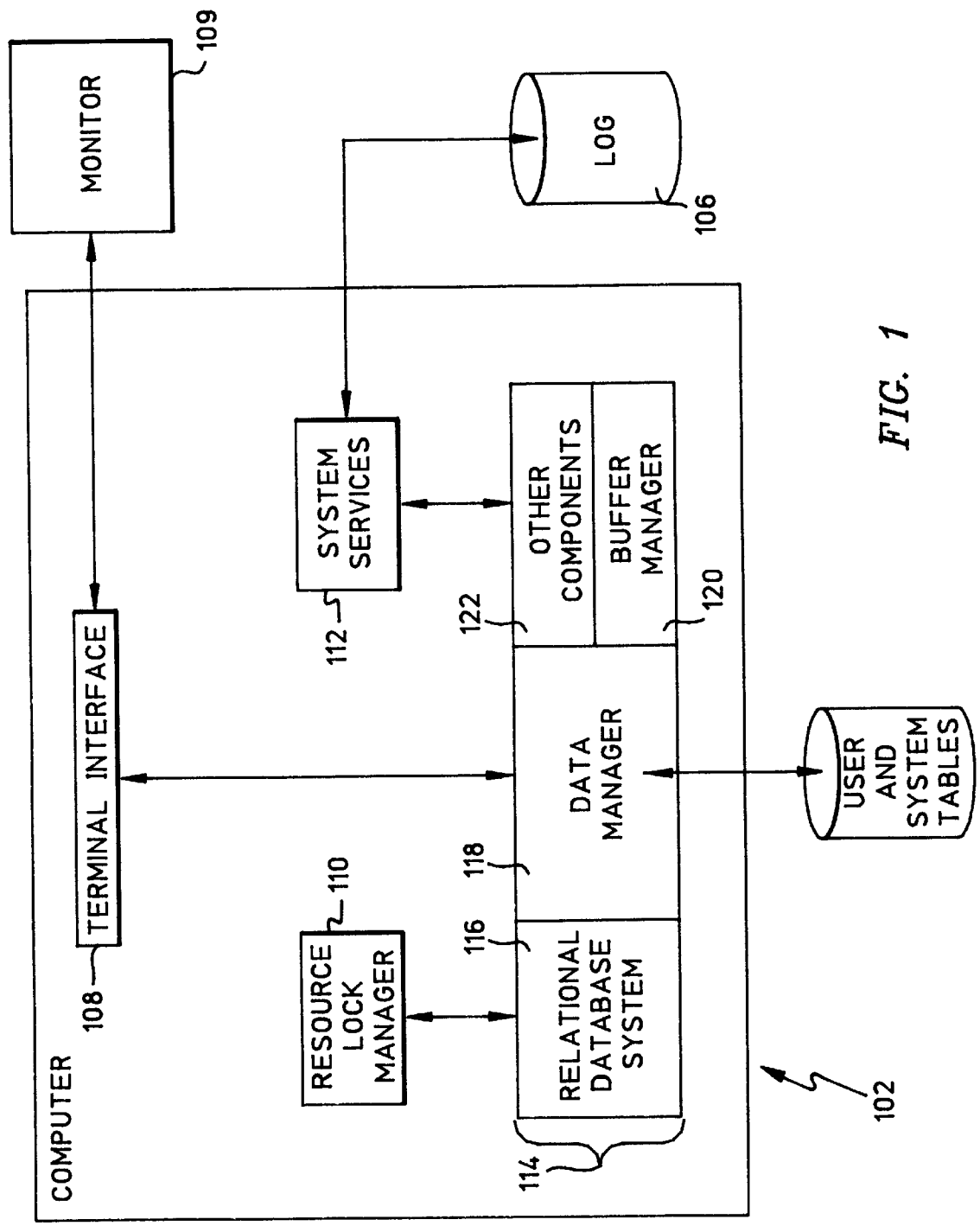
FIG. 1 shows a functional block diagram of a computer-implemented database processing system suitable for carrying out the present invention.

FIG. 1 shows a computer environment of the exemplary RDBMS system. In the exemplary computer environment, a computer system 102 at a node of the network accesses data storage devices, such as disk drives, in which are stored user and system tables 104 and log data tables 106. An operator of the computer system 102 uses a standard operator terminal interface 108, such as one of the interfaces known as IMS/DB/DC, CICS, TSO, OS/2, or some other similar interface, to transmit electrical signals to and from the computer system and monitor 109 that represent commands for performing various search and retrieval functions against the databases 104, 106. These search and retrieval functions are generally referred to as queries. In the preferred embodiment of the present invention, these queries conform to the SQL standard, and invoke functions performed by RDBMS software. In the preferred embodiment of the present invention, the RDBMS software comprises the "DB2" product offered by the International Business Machines (IBM) Corporation for the "MVS" or "OS/2" or "AIX" operating systems. Those skilled in the art will recognize, however, that the present invention has application to any RDBMS software that uses SQL.

As illustrated in FIG. 1, the DB2 product architecture for the MVS operating system includes three major components: the Resource Lock Manager ("RLM") 110, the System Services module 112, and the Database Services module 114. The RLM handles locking services, because DB2 treats data as a shared resource, thereby allowing any number of users to access the same data simultaneously, and thus concurrency control is required to isolate users and to maintain data integrity. The Systems Services module 112 controls the overall DB2 execution environment, including managing the log data sets 106, gathering system statistics, handling startup and shutdown operations, and providing management support.

At the center of the DB2 product architecture is the Database Services Processor module 114. The Database Services Processor module contains several submodules, including the Relational Database System (RDS) 116, the Data Manager 118, and the Buffer Manager 120, and other database components 122 including an SQL compiler/interpreter. These submodules support the functions of the SQL language, such as definitions, access control, retrieval, and update of user and system data. The Database Services Processor module 114 preferably comprises one or more processors that execute a series of computer-executable programming instructions. These programming instructions preferably reside in storage locations such as fast-access memory (not shown) of the computer 102. Alternatively, the instructions may be stored on a computer diskette, direct access storage device, magnetic tape, conventional "hard drive", electronic read-only memory, optical storage device, paper punch cards, or another suitable data storage medium (not shown) containing logically segmented storage locations.

As noted above, the SQL query processor of the RDBMS will respond to a user query having a full outer join by transforming the full outer join into a left outer join unioned with a right outer join minus the matched tuples. The transformed query is then provided to the SQL optimizer of the RDBMS, for use with known optimization techniques. In a preferred embodiment, such processing can take place in either an interactive operating mode or in a batch processing mode, as described below.

Interactive SQL Execution

Figure 2:
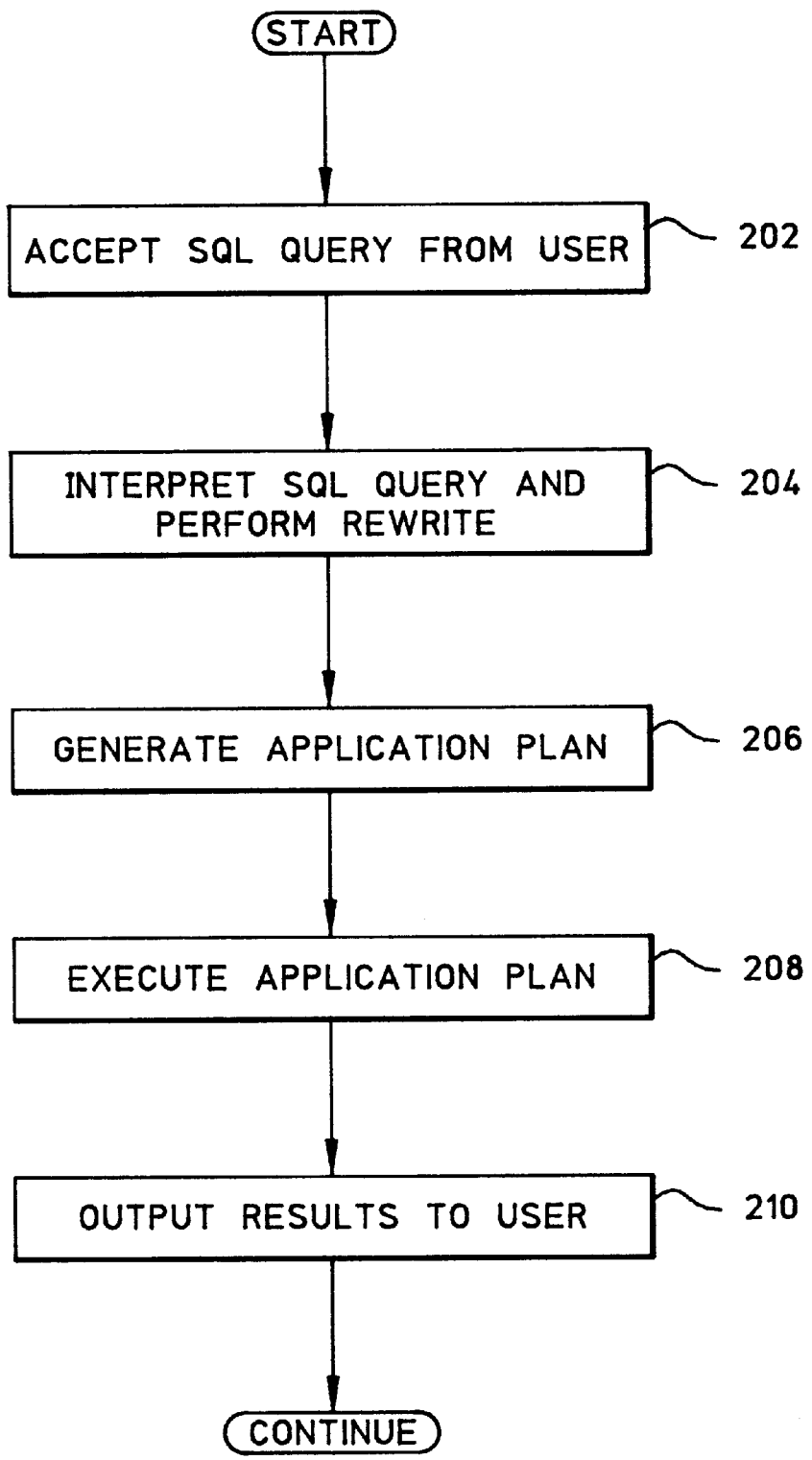
FIG. 2 is a flow diagram of the operating steps needed for interpreting and executing SQL statements in an interactive network environment.

FIG. 2 is a flow diagram that illustrates the operating steps necessary for the interpretation and execution of SQL statements in an interactive network environment. The first flow diagram box of FIG. 2, numbered 202, represents the input of an SQL statement into the computer system from the user. The next flow diagram box 204 of FIG. 2 represents the step of compiling or interpreting the received SQL statement. This step may include a transformation function that transforms the SQL query in a manner described in greater detail below to process full outer joins. The FIG. 2 flow diagram box numbered 206 represents the step of generating a compiled set of runtime structures called an application plan from the compiled SQL statements.

Generally, the SQL statements received as input from the user (step 202) specify the data the user wants, but not how to get to it. Generation of the application plans involve consideration of both the available access paths (indexes, sequential reads, etc.) and system held statistics on the data to be accessed (the size of the table, the number of distinct values in a particular column, etc.), to choose what the RDBMS processor considers to be the most efficient access path for the query. The FIG. 2 step represented by the flow diagram box numbered 208 represents the execution of the application plan. The last block 210 in FIG. 2 represents the output of the results of the application plan to the user.

Embedded/Batch SQL Execution

Figure 3:
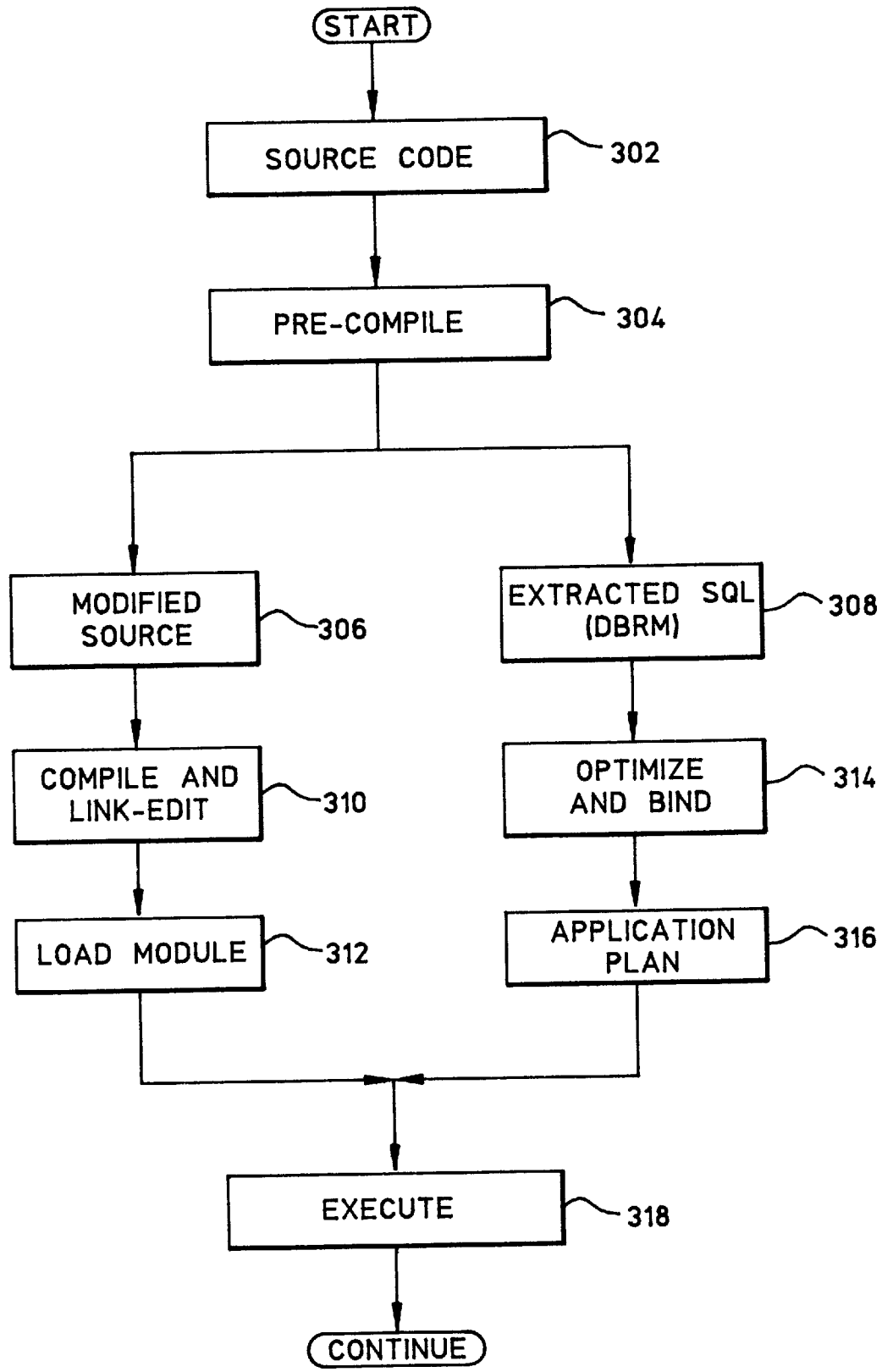
FIG. 3 is a flow diagram of the operating steps needed for interpreting and executing SQL statements embedded in source code for batch operation.

FIG. 3 is a flow diagram that illustrates the steps necessary for the interpretation and execution of SQL statements embedded in source code for batch operation according to the present invention. The first block 302 represents program source code containing a host language (such as COBOL or C) and embedded in SQL statements that is received by the RDBMS processor for batch processing. The received program source code is next subjected to a pre-compile step 304. There are two types of output code from the pre-compile step 304: a modified SQL source module 306 and a Database Request Module ("DBRM") 308. The modified SQL source module 306 contains host language calls to the DB2 program, which the precompile step 304 inserts into the pre-compile output code in place of the SQL source statements. The other output of the pre-compile step, the DBRM 308, consists of the SQL statements from the program source code 302.

After the modified source 306 is produced, a compile and link-edit step 310 uses the modified source output to produce a load module 312, while an optimize and bind step 314 uses the DBRM output 308 to produce a compiled set of runtime structures for the application plan 316. SQL statements from the program source code 302 specify only the data that the user wants, but not how to get to it. Generally, the optimize and bind step 314 optimizes the SQL query. The optimize and bind step then considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at the last step, represented by the flow diagram box numbered 318.

Operation of the Invention

Figure 4:
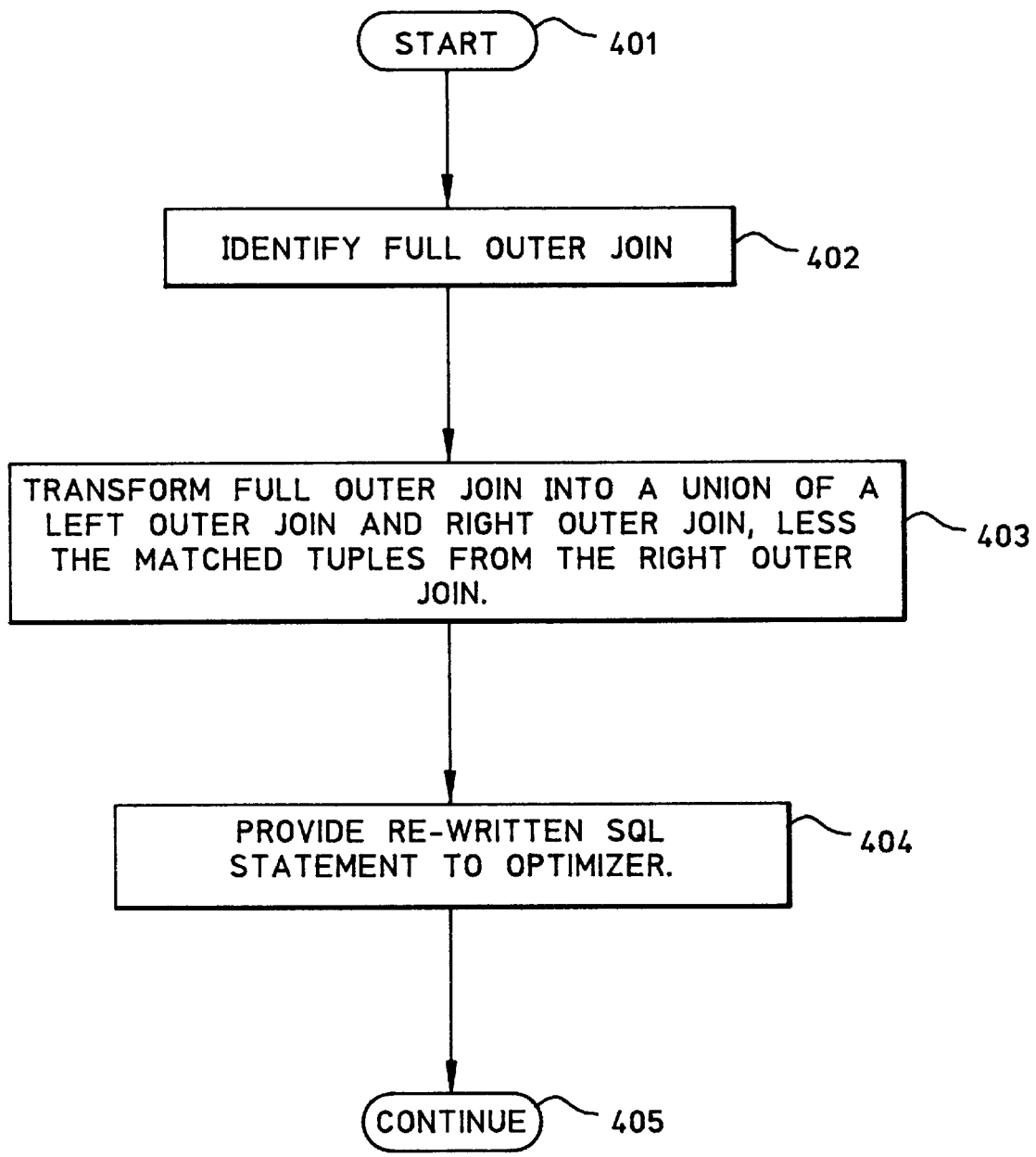
FIG. 4 is a flow diagram of a first preferred embodiment of the present invention.

A first preferred embodiment of the present invention devises, for the first time, a mechanism which enables a query implementing a full outer join with any join conditions, including but not necessarily limited to the inequality predicate and disjunction. This is enabled by equating, in a novel manner, a full outer join with a left outer join unioned with a right outer join less the matched tuples from the right outer join. Referring to FIG. 4, a flow diagram of this embodiment is shown. At 401, the routine is started, and at 402, the outer join to be performed is identified. At 403, the full outer join is programmatically transformed into a union of a left outer join and a right outer join, minus the matched tuples from the right outer join. The rewritten SQL statement which implements the transformed full outer join is provided to the RDBMS' optimizer (not shown) at 404, and program execution continues at 405. Consider a full outer join with join condition P(T1, T2):

```
SELECT q1.c1, q1.c2, q2.c1, q2.c2
FROM T1 q1 FULL OUTER JOIN T2 q2
ON P(T1,T2)
```

Having continued reference to FIG. 4, the transformation of this full outer join is programmatically implementable with the following set of SQL statements. These transform the full outer join into a union of a left outer join and a select query with a "not-exists" subquery, as follows:

```
SELECT q1.c1, q1.c2, q2.c1, q2.c2
FROM T1 q1 LEFT OUTER JOIN T2 q2
ON P(T1,T2)
```

```
        UNION ALL
        SELECT null, null, q2.c1, q2.c2
        FROM T2 q2
        WHERE NOT EXISTS (SELECT 1
            FROM T1 q1
            WHERE P(T1,T2))
```

The second operand of the union query returns T2 rows which do not match any rows in T1.

It is recognized that transforming a full outer join into a union query with a not-exists subquery may not provide optimally efficient computational performance. This is due to the fact that many subqueries are inherently slow to execute, especially in the MPP shared-nothing environment. Accordingly, the second preferred embodiment of the present invention presents a novel and computationally efficient full outer join with an arbitrary join condition capability.

Figure 5:
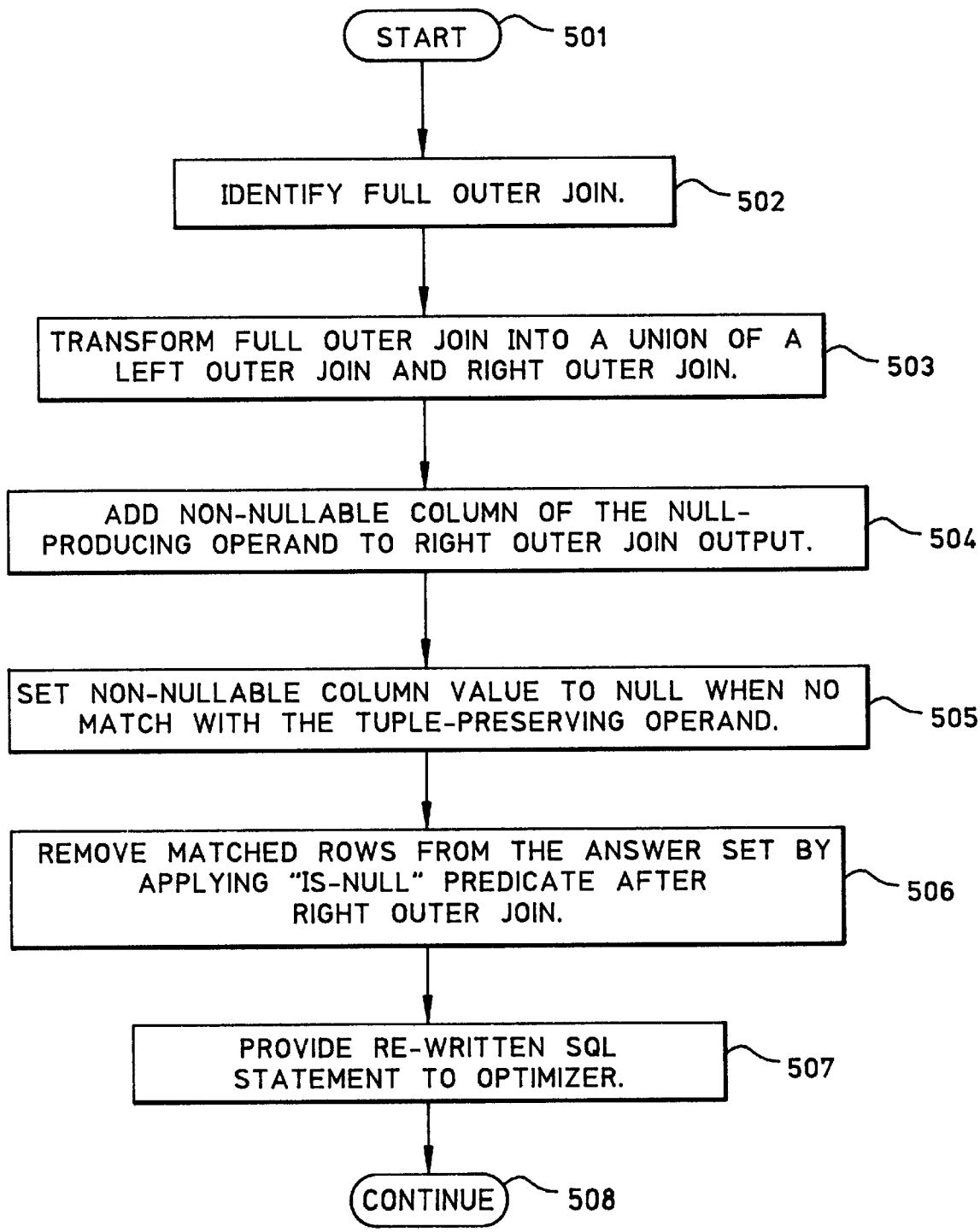
FIG. 5 is a flow diagram of a second preferred embodiment of the present invention implementing a first filtering methodology.

Having reference to FIG. 5, this embodiment of the present invention also transforms the full join query into a union query of left outer join and right outer join, at 501–503. However, in order to ensure that the query returns the correct answer, for the right outer join all the matched rows are filtered out from 504–506. To indicate that the output from the right outer join is a matched row, a non-nullable column of the null-producing operand is added to the output of the right outer join at 504. The non-nullable column includes a primary key (key), and a row identifier (rid) or tuple identifier (tid). The value of these columns is set to null at 505 when there is not a match on the tuple-preserving operand by the definition of the outer join. By applying the "IS NULL" predicate after the right outer join at 506, all matched rows are removed from the answer set. The rewritten SQL statement which implements the transformed full outer join is provided to the RDBMS' optimizer (not shown) at 507, and program execution continues at 508.

Consider the following three queries:

```
I.    SELECT q1.c1, q1.c2, q2.c1, q2.c2
      FROM T1 q1 LEFT OUTER JOIN T2 q2
      ON P(T1,T2)
      UNION ALL
      (SELECT q.c1, q.c2, q.c3, q.c4
       FROM TABLE(SELECT q3.c1, q3.c2, q4.c1, q4.c2, q3.tid
            FROM T1 q3 RIGHT OUTER JOIN T2 q4
            ON P(T1,T2)) as q(c1, c2, c3, c4, tid)
       WHERE q.tid IS NULL)
II.   SELECT q1.c1, q1.c2, q2.c1, q2.c2
      FROM T1 q1 LEFT OUTER JOIN T2 q2
      ON P(T1,T2)
      UNION ALL
      (SELECT q.c1, q.c2, q.c3, q.c4
       FROM TABLE(SELECT q3.c1, q3.c2, q4.c1, q4.c2, q3.rid
            FROM T1 q3 RIGHT OUTER JOIN T2 q4
            ON P(T1,T2)) as q(c1, c2, c3, c4, rid)
       WHERE q.rid IS NULL)
III.  SELECT q1.c1, q1.c2, q2.c1, q2.c2
      FROM T1 q1 LEFT OUTER JOIN T2 q2
      ON P(T1,T2)
      UNION ALL
      (SELECT q.c1, q.c2, q.c3, q.c4
       FROM TABLE(SELECT q3.c1, q3.c2, q4.c1, q4.c2, q3.key
            FROM T1 q3 RIGHT OUTER JOIN T2 q4
            ON P(T1,T2)) as q(c1, c2, c3, c4, key)
       WHERE q.key IS NULL)
```

It will be appreciated that each of these three queries returns the same answer set.

Figure 6:
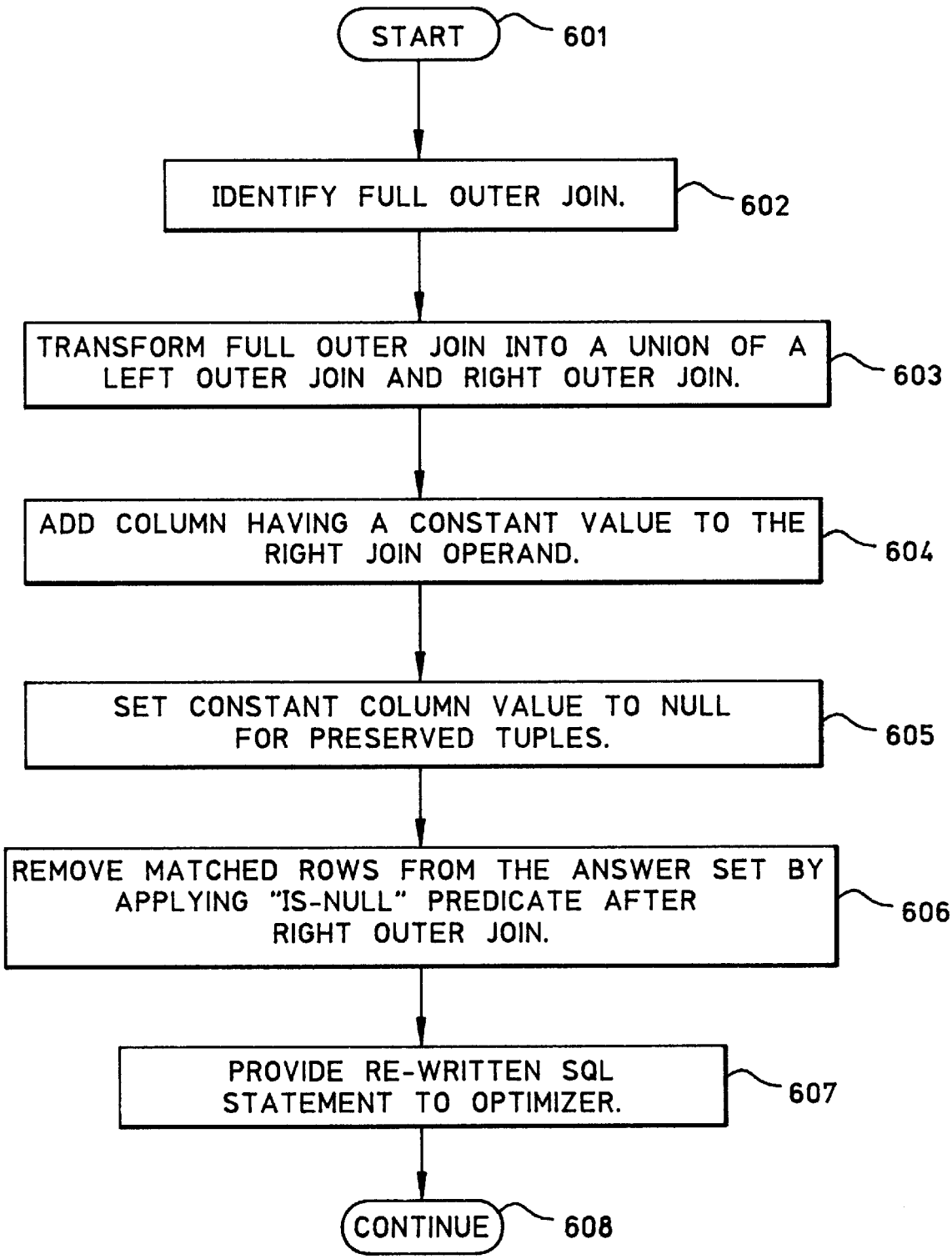
FIG. 6 is a flow diagram of third preferred embodiment of the present invention implementing a second filtering methodology.

The preceding approach is acceptable given a non-nullable column. FIG. 6 details another preferred embodiment useful where an outer join operand does not have any non-nullable column, for instance when the operand is a derived table, a column of constants could be added to achieve the same effect. For example, suppose both DT1 and DT2 are not base tables: i.e., their row identifiers were not readily avialable, and all columns were nullable. A full outer join for such a condition could then be rewritten as:

```
        SELECT q1.c1, q1.c2, q2.c1, q2.c2
        FROM DT1 q1 FULL OUTER JOIN DT2 q2
        ON P(DT1,DT2)
``` which in turn can be implemented as:

```
        SELECT q1.c1, q1.c2, q2.c1, q2.c2
        FROM DT1 q1 LEFT OUTER JOIN DT2 q2
        ON P(DT1,DT2)
        UNION ALL
        (SELECT q.c1, q.c2, q.c3, q.c4
         FROM TABLE(SELECT q3.c1, q3.c2, q4.c1, q4.c2, q3.key
             FROM TABLE(SELECT DT1.c1, DT1.c2, 1 FROM DT1)as
        q3(c1, c2, key)
             RIGHT OUTER JOIN DT2 q4 ON P(DT1,DT2)) as q(c1,c2,
                 c3, c4, key)
         WHERE q.key IS NULL)
```

Having continued reference to FIG. 6, this embodiment of the present invention also transforms the full join query into a union query of left outer join and right join, at 601–603. However, in order to ensure that the query returns the correct answer, for the right outer join all the matched rows are filtered out from 604–606. By adding a column of constant 1 at 604, or any other constant, in the null-producing operand of the right outer join, it is assured that the column value is null for the preserved tuples of DT2 (q4) at 605. By applying the "IS NULL" predicate after the right outer join at 606, all matched rows are removed from the answer set. The rewritten SQL statement which implements the transformed full outer join is provided to the RDBMS' optimizer (not shown) at 607, and program execution continues at 608. Hence, those DT2 rows that do not have any matching rows in DT1 are always selectable. This then discloses the third preferred embodiment of the present invention.

Figure 7:
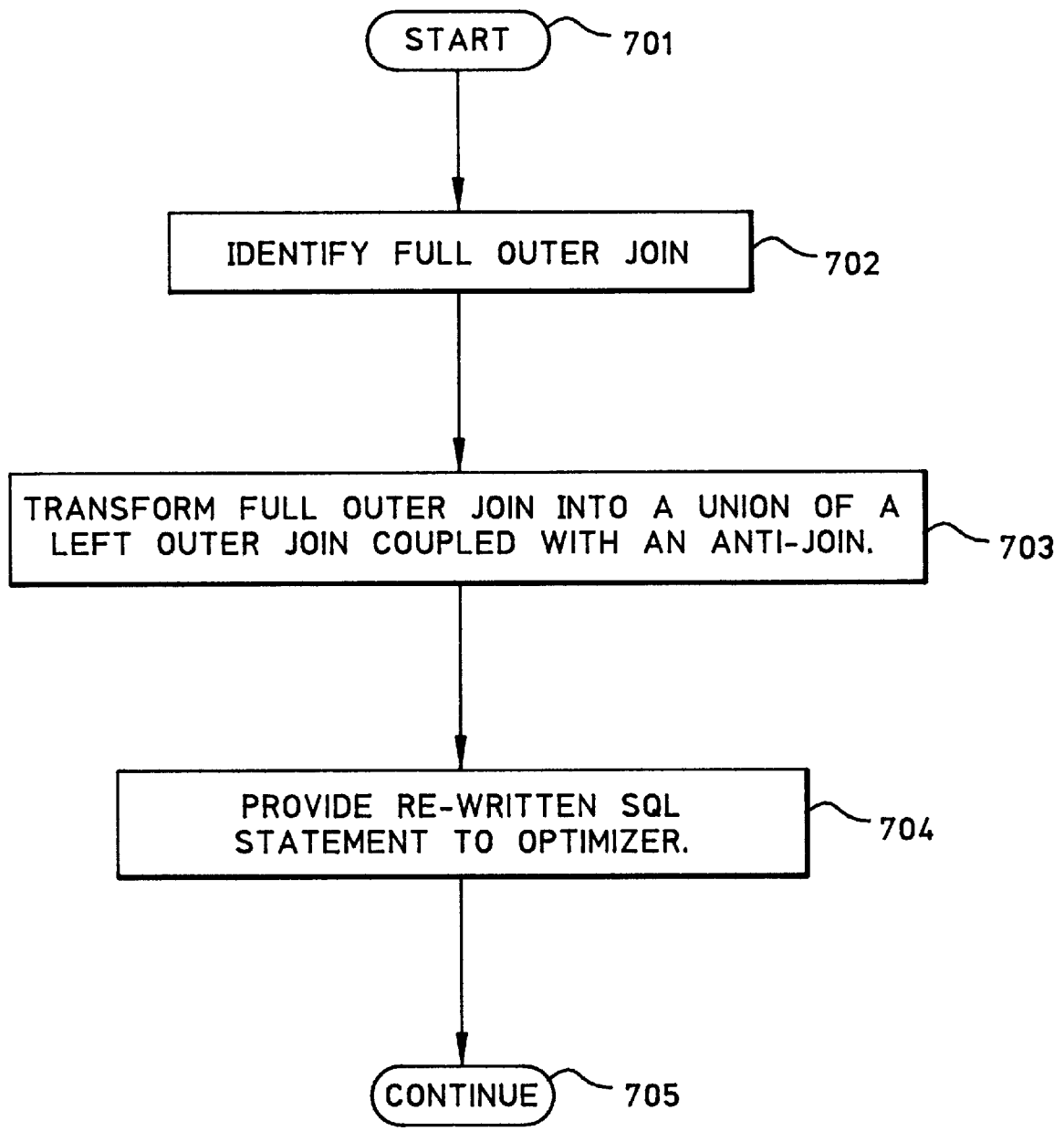
FIG. 7 is a flow diagram of fourth preferred embodiment of the present invention implementing an anti-join having an early out property.

A fourth preferred embodiment of the present invention is illustrated at FIG. 7. Given that the present invention implements a full outer join as a union of a left outer join and a right outer join, this embodiment further optimizes the full outer join methodology taught herein by recognizing that all the matched rows in the right outer join are to be filtered out. The right outer join operand of the union query thus becomes a novel operand, the anti-join defined below, which returns all rows in the tuple-preserving table which have no match in the null-producing table.

The anti-join is defined as follows:

Given tables T1 and T2, and ajoin condition P(T1, T2), the anti-join (T1, T2, P(T1, T2)) returns all T1 tuples that do not match with T2 tuples using join condition P(T1, T2).

Having continued reference to FIG. 7, in this embodiment after the full outer join is identified at 702, it is transformed as the union of a left outer join and an anti-join at 703. The rewritten SQL statement which implements the transformed full outer join is provided to the RDBMS' optimizer (not shown) at 704, and program execution continues at 705.

It should be noted that the anti-join is a novel operator, and does not form part of the standard SQL syntax, as currently defined. Anti join can be implemented directly using a new run time operator. Alternatively, an anti-join can be implemented using either a right or left outer join coupled with an ISNULL predicate on the non-nullable column of the null-producing operand. However, computing all the matched rows which will be eventually filtered out using prior methodologies requires considerable time and is hence computationally inefficient. Accordingly, the anti-join can be implemented more efficiently by a left or right outer join algorithm with early out capability: i.e., for a given row in a tuple-preserving table, the row will be output as soon as the first match in the null-producing table is found or there is no match in the null-producing table. Note that a left or right outer join algorithm with early out capability CAN NOT be used for implementing a regular left or right outer join because not ALL the matching tuple pairs will be returned in the answer set.

Given that the present invention implements a full outer join as a union of a left and a right outer join, the fourth preferred embodiment further optimizes the full outer join methodology taught herein by recognizing that all the matched rows in the right outer join are to be filtered out. In essence, the second operand of the union query is an anti-join, which is implemented as a right outer join coupled with an ISNULL predicate. Computing all matched rows which will be eventually filtered out can be very time consuming. Thus, one can implement the anti-join more efficiently by an outer join algorithm with early out capability. This leads to the following query rewrite transformation.

Given a view or derived table of left/right outer join which outputs a column of null-producing operand, and the column is not nullable:

```
CREATE VIEW DT ( . . . , C1) AS
   (SELECT . . . , T2.C1 /* non-nullable C1 */
   FROM T1 LEFT OUTER JOIN T2
   ON P)
```

If an ISNULL predicate is found involving the above mentioned column, then the early out property of the left outer join is true. For example,

```
SELECT *
FROM DT
WHERE C1 IS NULL
```

Thus, the implementation of the left outer join in DT has an early out property. The result remains the same, but the execution of the left outer join is much faster because as soon as there is a match in T2, the T1 row, which is then filtered out, can be output to the answer set. This avoids computing all matching rows before filtering.

To implement a full outer join using anti-join, consider a full outer join discussed above with join condition P(T1, T2):

```
SELECT q1.c1, q1.c2, q2.c1, q2.c2
FROM T1 q1 FULL OUTER JOIN T2 q
ON P(T1,T2)
```

The former statement can be rewritten as:

```
SELECT q1.c1, q1.c2, q2.c1, q2.c2
FROM T1 q1 LEFT OUTER JOIN T2 q2
ON P(T1,T2)
UNION ALL
```

```
(SELECT q.c1, q.c2, q.c3, q.c4
FROM TABLE(SELECT q3.c1, q3.c2, q4.c1, q4.c2, q3.tid
   FROM T1 q3 RIGHT OUTER JOIN T2 q4
   ON P(T1,T2)) as q(c1, c2, c3, c4, tid)
WHERE q.tid IS NULL)
```

It will be appreciated in this fourth preferred embodiment of the present invention that the RIGHT OUTER JOIN is marked with an early-out property and thus the anti-join is implemented. The same principle applies to other types of non-nullable columns, including tid, rid, key or a derived table with an extra column of a constant as previously discussed.

It should be emphasized that because the approach taught herein for implementing a full outer join utilizes the properties of the left/right outer join, there is no restriction on the join condition for the full outer join because there is no restriction on the join condition for the left/right outer join which enables it.

Moreover, the principles of the present invention specifically contemplate their utilization in interactive, batch, and embedded modes of processing, as well as all other processing methodologies well known to those having ordinary skill in the art.

While this invention is primarily discussed as a method, it will be understood by a person of ordinary skill in the art that the apparatus discussed above in connection with FIG. 1 may be programmed or otherwise designed to facilitate the practice of the method of this invention. Further, that an article of manufacture, such as a recordable media for use with a data processing system including but not limited to floppy disks, magnetic tape, optical storage and retrieval media including CD-ROMs and others well known to those having ordinary skill in the art, can be used to implement the invention disclosed herein. It should be well understood that all such apparatus and articles of manufacture also fall within the spirit and scope of this invention.

The present invention has been particularly shown and described with respect to certain preferred embodiments of features thereof. Clearly, other embodiments and modifications of this invention may occur readily to those of ordinary skill in the art in view of these teachings. It should therefore be readily apparent to those of ordinary skill in the art that various changes and modifications in form and detail may be made without departing from the spirit and scope of the invention as set forth in the appended claims. Therefore, this invention is limited only by the following claims, which include all such embodiments and modifications when viewed in conjunction with the above specification and accompanying drawing, and the invention disclosed herein may be practiced without any element which is not specifically disclosed herein.

In particular, the principles of the present invention specifically contemplate the use of alternative query languages, computer architectures, and database management systems.

We claim:

1. In a relational database management system utilizing a data processor for storing data in the form of at least a first table defining a first operand and a second table defining a second operand, the first and second tables comprised of tuples having one or more columns, wherein the data contained in the relational database management system is retrievable by means of query language queries to the database management system, a data processor implemented method for returning an answer set from the data in the tables responsive to a query to the database management system, the answer set requiring the matching of tuples from the first table and the second table, the method comprising the step of joining the tuples of the first and second tables using a full outer join with a join condition, the join condition being free of restrictions as to the type of join condition specified, the step of joining including unioning a left outer join with a right outer join less the matched tuples from the right outer join.

2. The method of claim 1 wherein the join condition is from the set of comparison operators consisting of: IS NULL; LIKE; EQUALS; DOES NOT EQUAL; IS GREATER THAN; IS LESS THAN; IS GREATER THAN OR EQUAL TO; and IS LESS THAN OR EQUAL TO.

3. The method of claim 2 further comprising the step of combining a plurality of the comparison operators with at least one of the logical operators selected from the list consisting of: AND; OR; and NOT.

4. In a relational database management system utilizing a data processor for storing data in the form of at least a first table defining a first operand and a second table defining a second operand, the first and second tables comprised of tuples having at least one column, wherein the data contained in the relational database management system is retrievable by means of query language queries to the database management system, a data processor implemented method for returning an answer set from the data in the tables responsive to a query to the database management system, the answer set requiring the matching of tuples from the first table and the second table, the method comprising the step of joining the tuples of the first and second tables using a full outer join with any join condition specifiable in the query language, the step of joining including unioning a left outer join with a right outer join less the matched tuples from the right outer join.

5. The method of claim 4 wherein the join condition is from the set of comparison operators consisting of: IS NULL; LIKE; EQUALS; DOES NOT EQUAL; IS GREATER THAN; IS LESS THAN; IS GREATER THAN OR EQUAL TO; and IS LESS THAN OR EQUAL TO.

6. The method of claim 5 further comprising the step of combining a plurality of the comparison operators with at least one of the logical operators selected from the list consisting of: AND; OR; and NOT.

7. In a relational database management system utilizing a data processor for storing data in the form of at least a first table defining a first operand and a second table defining a second operand, the first and second tables comprised of tuples having at least one column, wherein the data contained in the relational database management system is retrievable by means of query language queries to the database management system, a data processor implemented method for returning an answer set from the data in the tables responsive to a query to the database management system, the answer set requiring the matching of tuples from the first table and the second table, the method comprising the steps of:

for a full outer join condition, receiving a full outer join query of the tuples of the first operand and the tuples of the second operand, with a join condition, wherein the second operand has at least one non-nullable column;

programmatically transforming the full outer join query into a union query of a left outer join of the first and second operands, and a right outer join of the first and second operands; and filtering from the answer set all the matched rows of the right outer join.

8. The method of claim 7, wherein the transforming step further comprises the step of programmatically transforming the right outer join using an early out property.

9. The method of claim 7 wherein the second operand is a null-producing operand and the filtering step further comprises the steps of:

adding a non-nullable column of the null-producing operand to the output of the right outer join; and applying an IS NULL predicate on the non-nullable column after the operation of the right outer join, whereby all matched rows are filtered from the answer set.

10. The method of claim 9 wherein the step of adding a non-nullable column further comprises the step of including in the non-nullable column at least one of: a primary key; a row identifier; and a tuple identifier.

11. In a relational database management system utilizing a data processor for storing data in the form of at least a first table defining a first operand and a second table defining a second operand, the first and second tables comprised of tuples having at least one column, both tables being tables other than base tables, wherein the data contained in the relational database management system is retrievable by means of query language queries to the database management system, a data processor implemented method for returning an answer set from the data in the tables responsive to a query to the database management system, the answer set requiring the matching of tuples from the first table and the second table, the method comprising the steps of:

for a full outer join condition, receiving a full outer join query of the tuples of the first operand and the tuples of the second operand, with a join condition, wherein the second operand has the property of being free of non-nullable columns;

programmatically transforming the full outer join query into a union query of a left outer join of the first and second operands and a right outer join of the first and second operands; and filtering from the answer set all the matched rows of the right outer join.

12. The method of claim 11, wherein the transforming step further comprises the step of programmatically transforming the right outer join using an early out property.

13. The method of claim 11 wherein the second operand is a null-producing operand and the filtering step further comprises the step of adding a column having a constant value to the null-producing operand, and to the output of the right outer join.

14. The method of claim 13 further comprising the step of applying an IS NULL predicate on the added column after the operation of the right outer join, whereby all matched rows are filtered from the answer set.

15. In a relational database management system utilizing a data processor for storing data in the form of at least a first table defining a first operand and a second table defining a second operand, the first and second tables comprised of tuples having at least one column, wherein the data contained in the relational database management system is retrievable by means of query language queries to the database management system, a data processor implemented method for returning an answer set from the data in the tables responsive to a query to the database management system, the method comprising the steps of:

identifying the query as a full outer join query having an answer set including tuplesles of the first table that do not match tuples of the second table; and executing an anti-join query of the first and second tables with a join condition using a run time operator with early out property.

16. The method of claim 15 wherein the join condition is from the set of comparison operators consisting of: IS NULL; LIKE; EQUAL; DOES NOT EQUAL; IS GREATER THAN; IS LESS THAN; IS GREATER THAN OR EQUAL TO; and IS LESS THAN OR EQUAL TO.

17. The method of claim 16 further comprising combining a plurality of the comparison operators with at least one of the logical operators selected from the list consisting of: AND, OR; and NOT.

18. In a relational database management system utilizing a data processor for storing data in the form of at least a first table defining a first operand and a second table defining a second operand, the first and second tables comprised of tuples having at least one column, wherein the data contained in the relational database management system is retrievable by means of query language queries to the database management system, a data processor implemented method for returning an answer set from the data in the tables responsive to a query to the database management system, the answer set comprising of the first table tuples that do not match the second table tuples, the method comprising the steps of:

receiving an anti-join query of the first and second tables with a join condition, wherein the second table has at least one non-nullable column;

programmatically transforming the anti-join into a left outer join of the first and second tables with an early out property; and filtering from the answer set all the matched rows of the left outer join.

19. The method of claim 18 wherein the filtering step further comprises the steps of:

adding a non-nullable column of the second table to the output of the left outer join;

applying an IS NULL predicate on the non-nullable column after the operation of the left outer join, whereby all matched rows are filtered from the answer set.

20. The method of claim 19 wherein the step of adding a non-nullable column further comprises the step of including in the non-nullable column at least one of: a primary key; a row identifier; and a tuple identifier.

21. In a relational database management system utilizing a data processor for storing data in the form of at least a first table defining a first operand and a second table defining a second operand, the first and second tables comprised of tuples having at least one column, wherein the data contained in the relational database management system is retrievable by means of query language queries to the database management system, a data processor implemented method for returning an answer set from the data in the tables responsive to a query to the database management system, the answer set comprising tuples of the first table that do not match the tuples of the second table, the method comprising the steps of:

receiving an anti-join query of the first and second tables with a join condition, wherein the second table has the property of being free of non-nullable columns;

programmatically transforming the anti-join into a left outer join with an early out property; and filtering from the answer set all the matched rows of the left outer join.

22. The method of claim 21 wherein the filtering step further comprises the steps of:

adding a column having a constant value to the second operand, and to the output of the left outer join.

23. The method of claim 22 further comprises the step of applying an IS NULL predicate on the added column after the operation of the left outer join, whereby all matched rows are filtered from the answer set.

24. In a relational database management system utilizing a data processor for storing data in the form of at least a first table defining a first operand and a second table defining a second operand, the first and second tables comprised of tuples having at least one column, wherein the data contained in the relational database management system is retrievable by means of query language queries to the database management system, a data processor implemented method for returning an answer set from the data in the tables responsive to a query to the database management system, the answer set requiring the matching of tuples from the first table and the second table, the method comprising the steps of:

receiving a full outer-join query of the tuples of the first tables with a join condition;

programmatically transforming the full outer join query into a union query of a left outer join of the first and second operands, and an anti-join of the first and second operands using a new run time operator.

25. The method of claim 24 wherein the join condition is from the set of comparison operators consisting of: IS NULL; LIKE; EQUALS; DOES NOT EQUAL; IS GREATER THAN; IS LESS THAN; IS GREATER THAN OR EQUAL TO; and IS LESS THAN OR EQUAL TO.

26. The method of claim 25 further comprising combining a plurality of the comparison operators with at least one of the logical operators selected from the list consisting of: AND, OR; and NOT.

27. A computer-implemented apparatus, with bus means, processor means, data storage means, input and output means and a relational database management system, for storing data in the form of at least a first table defining a first operand and a second table defining a second operand, the first and second tables comprised of tuples having one or more columns, wherein the data contained in the relational database management system is retrievable by means of query language queries to the database management system, which apparatus returns an answer set from the data in the tables responsive to a query to the database management system, the apparatus comprising programmatic means for identifying the query as a full outer join query having an answer set requiring the matching of tuples from the first table and the second table, and programmatic means for joining the tuples of the first and second tables using a full outer join with a join condition, the join condition having the property of being free of restrictions as to the type of join condition specified, the means for joining comprising programmatic means for unioning a left outer join with a right outer join less the matched tuples from the right outer join.

28. The apparatus of claim 27 wherein the join condition is from the set of comparison operators consisting of: IS NULL; LIKE; EQUALS; DOES NOT EQUAL; IS GREATER THAN; IS LESS THAN; IS GREATER THAN OR EQUAL TO; and IS LESS THAN OR EQUAL TO.

29. The apparatus of claim 28 further comprising programmatic means for combining a plurality of the comparison operators with at least one of the logical operators selected from the list of logical operators consisting of: AND; OR; and NOT.

30. A computer-implemented apparatus, with bus means, processor means, data storage means, input and output means and a relational database management system, for storing data in the form of at least a first table defining a first operand and a second table defining a second operand, the first and second tables comprised of tuples having at least one column, wherein the data contained in the relational database management system is retrievable by means of query language queries to the database management system, the apparatus for returning an answer set from the data in the tables responsive to a query to the database management system, the apparatus comprising programmatic means for identifying the query as a full outer join query having an answer set requiring the matching of tuples from the first table and the second table, and programmatic means for joining the tuples of the first and second tables using a full outer join with any join condition specifiable in the query language, the means for joining comprising means for unioning a left outer join with a right outer join less the matched tuples from the right outer join.

31. The apparatus of claim 30 wherein the join condition is from the set of comparison operators consisting of: IS NULL; LIKE; EQUALS; DOES NOT EQUAL; IS GREATER THAN; IS LESS THAN; IS GREATER THAN OR EQUAL TO; and IS LESS THAN OR EQUAL TO.

32. The apparatus of claim 31 further comprising means for combining a plurality of the comparison operators with at least one of the logical operators selected from the list of logical operators consisting of: AND; OR; and NOT.

33. In a relational database management system utilizing a data processor for storing data in the form of at least a first table defining a first operand and a second table defining a second operand, the first and second tables comprised of tuples having at least one column, wherein the data contained in the relational database management system is retrievable by means of query language queries to the database management system, a data processing apparatus ("apparatus") for returning an answer set from the data in the tables responsive to a query to the database management system, the answer set requiring the matching of tuples from the first table and the second table, the apparatus comprising:

for a full outer join condition, programmatic means for receiving a full outer join query of the tuples of the first operand and the tuples of the second operand, with a join condition, wherein the second operand has at least one non-nullable column;

programmatic means for transforming the full outer join query into a union query of a left outer join of the first and second operands and a right outer join of the first and second operands; and programmatic means for filtering from the answer set all the matched rows of the right outer join.

34. The apparatus of claim 33 wherein the means for transforming is further transforming the right outer join using an early out property.

35. The apparatus of claim 33 wherein the second operand is a null producing operand and the programmatic means for filtering further comprises:

programmatic means for adding a non-nullable column of the null-producing operand to the output of the right outer join; and programmatic means for applying an IS NULL predicate on the non-nullable column after the operation of the right outer join, whereby all matched rows are filtered from the answer set.

36. The apparatus of claim 35 wherein the programmatic means for adding a non-nullable column further comprises programmatic means for including in the non-nullable column at least one of: a primary key; a row identifier; and a tuple identifier.

37. In a relational database management system utilizing a data processor for storing data in the form of at least a first table defining a first operand and a second table defining a second operand, the first and second tables comprised of tuples having at least one column, wherein the data contained in the relational database management system is retrievable by means of query language queries to the database management system, a data processing apparatus ("apparatus") for returning an answer set from the data in the tables responsive to a query to the database management system, the answer set requiring the matching of tuples from the first table and the second table, the apparatus comprising:

for a full outer join condition, programmatic means for receiving a full outer join query of the tuples of the first operand and the tuples of the second operand, with a join condition, wherein the second operand has the property of being free of non-nullable columns;

programmatic means for transforming the full outer join query into a union query of a left outer join of the first and second operands and a right outer join of the first and second operands; and programmatic means for filtering from the answer set all the matched rows of the right outer join.

38. The apparatus of claim 37 wherein the means for transforming is further for transforming the right outer join using an early out property.

39. The apparatus of claim 37 wherein the second operand is a null-producing operand and the programmatic means for filtering further comprises programmatic means for adding a column having a constant value to the null-producing operand, and to the output of the right outer join.

40. The apparatus of claim 39 wherein the programmatic means for filtering further comprises means for applying an IS NULL predicate after the operation of the right outer join, whereby all matched rows are filtered from the answer set.

41. In a relational database management system utilizing a data processor for storing data in the form of at least a first table defining a first operand and a second table defining a second operand, the first and second tables comprised of tuples having at least one column, wherein the data contained in the relational database management system is retrievable by means of query language queries to the database management system, a data processor for returning an answer set form the data in the tables responsive to a query to the database management system, the data processor comprising:

means for identifying the query as a full outer join query having an answer set including tuples of the first table that do not match tuples of the second table; and means for executing an anti-join query of the first and second tables with a join condition using a new run time operator with early out property.

42. The data processor of claim 41 wherein the join condition is from the set of comparison operators consisting of: IS NULL; LIKE; EQUAL; DOES NOT EQUAL; IS GREATER THAN; IS LESS THAN; IS GREATER THAN OR EQUAL TO; and IS LESS THAN OR EQUAL TO.

43. The method of claim 42 wherein a plurality of the comparison operators are combined with at least one of the logical operators selected from the list consisting of: AND, OR; and NOT.

44. In a relational database management system utilizing a data processor for storing data in the form of at least a first table defining a first operand and a second table defining a second operand, the first and second tables comprised of tuples having at least one column, wherein the data contained in the relational database management system is retrievable by means of query language queries to the database management system, a data processor for returning an answer set from the data in the tables responsive to a query to the database management system, the answer set comprising of the first table tuples that do not match the second table tuples, the data processor comprising:

means for receiving an anti-join query of the first and second tables with a join condition, wherein the second table has at least one non-nullable column;

means for programmatically transforming the anti-join into a left outer join of the first and second tables with an early out property; and means for filtering from the answer set all the matched rows of the left outer join.

45. The data processor of claim 44 wherein the means for filtering is further for:

adding a non-nullable column of the second table to the output of the left outer join;

applying an IS NULL predicate on the non-nullable column after the operation of the left outer join, whereby all matched rows are filtered from the answer set.

46. The data processor of claim 45 wherein the function of adding a non-nullable column further comprises the function of including in the non-nullable column at least one of: a primary key; a row identifier; and a tuple identifier.

47. In a relational database management system utilizing a data processor for storing data in the form of at least a first table defining a first operand and a second table defining a second operand, the first and second tables comprised of tuples having at least one column, wherein the data contained in the relational database management system is retrievable by means of query language queries to the database management system, a data processor for returning an answer set from the data in the tables responsive to a query to the database management system, the answer set comprising of the first table tuples that do not match the second table tuples, the data processor comprising:

means for receiving an anti-join query of the first and second tables with a join condition, wherein the second table has the property of being free of non-nullable columns;

means for programmatically transforming the anti-join into a left outer join with an early out property; and means for filtering from the answer set all the matched rows of the left outer join.

48. The method of claim 47 wherein the filtering function further comprises the function of:

adding a column having a constant value to the second operand, and to the output of the left outer join.

49. The method of claim 48 wherein the filtering function further comprises the function of applying an IS NULL predicate on the added column after the operation of the left outer join, whereby all matched rows are filtered from the answer set.

50. In a relational database management system utilizing a data processor for storing data in the form of at least a first table defining a first operand and a second table defining a second operand, the first and second tables comprised of tuples having at least one column, wherein the data contained in the relational database management system is retrievable by means of query language queries to the database management system, a data processor for returning an answer set from the data in the tables responsive to a query to the database management system, the answer set requiring the matching of tuples from the first table and the second table, the data processor comprising:

means for receiving a full outer-join query of the tuples of the first tables with a join condition; and means for programmatically transforming the full outer join query into a union query of a left outer join of the first and second operands, and an anti-join of the first and second operands using a run time operator.

51. The data processor of claim 50 wherein the join condition is from the set of comparison operators consisting of: IS NULL; LIKE; EQUALS; DOES NOT EQUAL; IS GREATER THAN; IS LESS THAN; IS GREATER THAN OR EQUAL TO; and IS LESS THAN OR EQUAL TO.

52. The data processor of claim 51 further comprising combining a plurality of the comparison operators with at least one of the logical operators selected from the set consisting of: AND, OR; and NOT.

* * * * *